United States Patent [19]

Stieg et al.

[11] Patent Number: 4,534,748
[45] Date of Patent: Aug. 13, 1985

[54] VARIABLE SPEED BELT DRIVEN TRANSMISSION SYSTEM AND METHOD

[75] Inventors: Richard F. Stieg, Boulder; John P. Dolan, Littleton; W. Spencer Worley, Aurora, all of Colo.; Göran Gerbert, Staffanstorp, Sweden

[73] Assignee: The Gates Rubber Company, Denver, Colo.

[21] Appl. No.: 335,981

[22] Filed: Dec. 30, 1981

[51] Int. Cl.³ .................... F16H 55/56; F16H 11/06; F16H 55/54; F16H 55/52
[52] U.S. Cl. .......................... 474/17; 474/8; 474/12; 474/19; 474/46
[58] Field of Search ............... 474/8, 12, 17, 19, 46; 74/856, 861, 862

[56] References Cited

U.S. PATENT DOCUMENTS

| | | | |
|---|---|---|---|
| 2,531,905 | 11/1950 | Carpenter | 74/1 |
| 3,699,827 | 10/1972 | Vogel | 474/12 |
| 3,771,377 | 11/1973 | Bush | 474/17 |
| 3,850,050 | 11/1974 | Lemmens | 474/13 |
| 3,864,983 | 2/1975 | Jacobsen | 74/89 |
| 3,868,862 | 3/1975 | Bessette | 474/12 |
| 3,888,130 | 6/1975 | Blanchette | 474/12 |
| 4,241,618 | 12/1980 | Smirl | 474/12 |

FOREIGN PATENT DOCUMENTS

| | | | |
|---|---|---|---|
| 103785 | 2/1974 | German Democratic Rep. | |
| 1363504 | 8/1974 | United Kingdom | 474/8 |

OTHER PUBLICATIONS

B. G. Gerbert, "Force and Slip Behavior and V-Belt Drives", SAE Acta Polytechnica Scandinavica, Mech. Ang. Series, No. 67, Helsinki, 1972.

B. G. Gerbert, "Adjustable Speed V-Belt Drives—Mechanical Properties and Design", SAE Paper 740747, (1974).

Primary Examiner—Lawrence J. Staab
Assistant Examiner—Michael D. Bednarek
Attorney, Agent, or Firm—H. W. Oberg, Jr.; C. H. Castleman, Jr.

[57] ABSTRACT

A variable speed belt drive transmission system with a driven pulley having a movable pulley half operated to move axially with generated axial forces that decrease from where the driven pulley is closed to where the driven pulley is open, the maximum generated force being from about 100 to about 120 percent of a required pulley axial force where theoretical belt slip could occur.

A method for enhancing belt life by controlling belt tension with driven pulley axial force by establishing a required driven pulley axial force that decreases from where the driven pulley is closed to where the driven pulley is open, the generated force lines being from about 100 to about 120 percent of a determined pulley axial force line where theoretical belt slip impends.

An actuator for a pulley where a plurality of circumjacent links are arranged in "squirrel cage, treadmill" fashion where one end portion of the links are attached to a movable pulley half and the other end portion of the links are attached to a shaft common to the movable pulley half.

18 Claims, 16 Drawing Figures

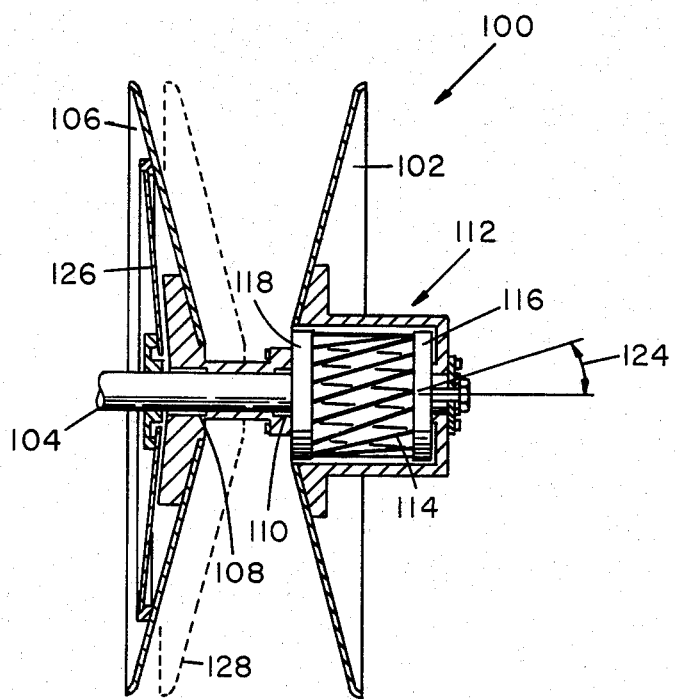
FIG. 12
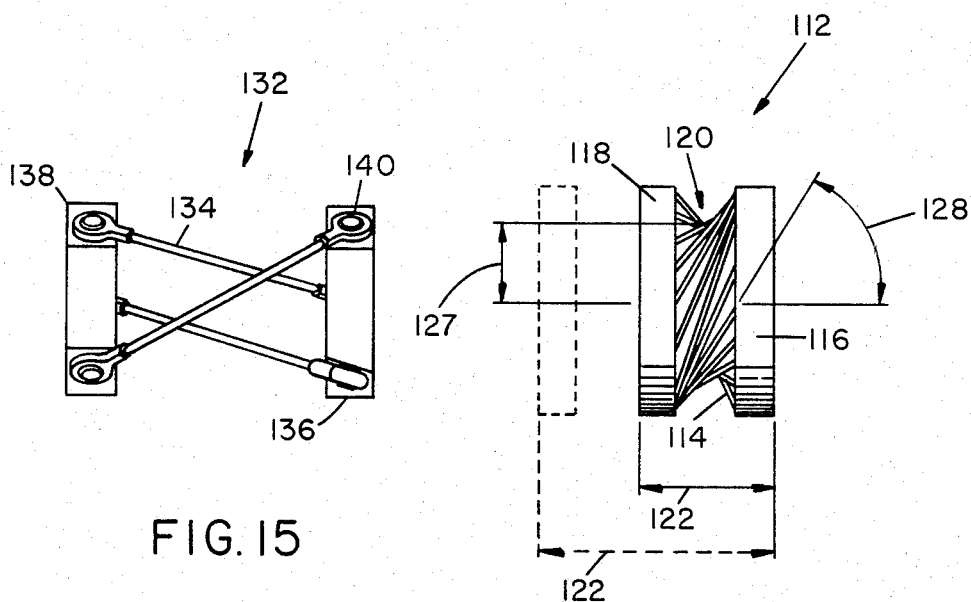
FIG. 15
FIG. 13

VARIABLE SPEED BELT DRIVEN TRANSMISSION SYSTEM AND METHOD

BACKGROUND OF THE INVENTION

The invention relates to variable speed belt driven transmission systems, but more particularly, the invention relates to variable speed belt driven transmission systems apparatus, and methods for improving axial forces at the driven pulley of the transmission for enhanced belt life.

Adjustable speed V-belt drives are variable speed belt transmission systems which are either manually or automatically regulated. Belt driven transmissions are used in various machinery such as agricultural equipment, snowmobiles, automobiles, and industrial equipment. The drives are powered at some peak torque by some source such as a motor, and may be required to deliver power at various speed ratios and torques to a constantly changing output load. In automotive applications, for example, an internal combustion engine having peak and transient torque characteristics, delivers power at various speed ratios through a transmission to vehicle wheels that react to changing road loads (e.g., windage, hills, and speed). Belt driven transmissions customarily are designed to automatically shift to accommodate changing road loads.

The prior art is replete with examples of automatic pulley shifters or actuators that are either speed responsive, torque responsive, or combinations thereof. The shifters may be mechanically operated, electrically operated, pneumatically or hydraulically operated. The speed responsive system may use centrifugal fly weights, and torque responsive actuators may use helical torque ramps or a hydraulic pressure that is generally related to torque. This invention is primarily directed to a belt driven transmission system which uses a torque sensing device in association with the driven pulley of the belt driven transmission.

In comparison to the replete examples of pulley actuators, there are only a handful of references dealing with mathematical analysis of the various kinds of variable speed belt transmissions. However, the references are excellent and some of them are: (1) W. S. Worley, "Designing Adjustable-Speed V-Belt Drives For Farm Implements." SAE Transactions, Vol. 63 (1955); (2) L. R. Oliver and V. D. Henderson, "Torque Sensing Variable Speed V-Belt Drive." SAE Transactions, Vol. 81 (1972); (3) B. G. Gerbert, "Force and Slip Behavior and V-Belt Drives." Acta Polytechnica Scandinavica, MECH. ANG. Series No. 67, Helsinki, (1972); (4) B. G. Gerbert, "Adjustable Speed V-Belt Drives—Mechanical Properties and Design." SAE Paper 740747 (1974); (5) B. G. Gerbert, "Doctors Thesis on V Belt Drives with special reference to force conditions, slip, and power loss." Lund Technical University, Lund, Sweden, (1973); and (6) B. G. Gerbert, "A Complementary Large Slip Solution in V-Belt Mechanics," ASME Paper 77- DET -162 (1977).

Reference (4) Supra, analyzes various types of adjustable speed V-Belt drives and at page 5, example 5, a driven pulley with a torque ramp for closing the pulley halves together responsive to rotational torque, is discussed in conjunction with FIG. 3 showing driven pulley axial forces as a function of the coefficient of traction. The axial force coefficient of traction type charts are useful for showing an axial force, tension interrelationship for a variable speed belt drive. Dimensionless axial force, $F/(T_1+T_2)$ where F is axial force, $T_1$ is tight side belt tension and $T_2$ is slack side belt tension, is scaled on the ordinate and traction ratio $(T_1-T_2)/(T_1+T_2)$, is scaled on the abcissa. Such charts show that dimensionless axial force at the driven pulley is generally a constant band for all traction ratios and speed ratios. Comparatively, the dimensionless axial force at the driver pulley drastically increases with traction ratio for all speed ratios. Thus, the axial forces at the driven pulley generally define the total tension $(T_1+T_2)$ in the drive as well as the force available to produce torque $(T_1-T_2)$ for transmitting power. Of course, the interrelationship between axial force and traction ratio is influenced by belt design, pulley diameter, and pulley center distance. These interrelationships are also discussed in the above mentioned references.

For the purpose of this disclosure, the characteristics of the surface contact between the sidewalls of a V-belt and the surfaces of a pulley are described as having one of two possible extreme conditions:

1. "Slip" is defined as a state where relative sliding velocity exists at every point along the wrapped or "total arc" of contact between the belt and pulley. Hence, there is a shearing force due to sliding friction and a resulting change in belt tension along the total arc.

2. "Creep" is defined as a state where there is (1) a first portion of the total arc where the belt sidewalls have zero velocity relative to the pulley and (2) a second portion of the total arc where the belt sidewalls have some velocity relative to the pulley. The arc having zero relative velocity, hence, no shearing force between the belt sidewalls and pulley due to sliding friction, is defined as "seating arc" and is characterized as a region of constant belt tension. The portion of the total arc having relative velocity is defined as the "active arc" and is characterized as a region of changing belt tension. There is relative velocity between the belt and pulley due to elongation or compression of the belt because of changing tension, or because of changing radial penetration of the belt in the pulley caused by changing tension.

It is well known that as the transmitted torque increases (Reference 6), a belt will change from the creep condition where there is both a seating arc and an active arc, to the slip condition where there is no seating arc. The slip condition limits the amount of torque that can be transmitted and is characterized by an ever increasing power loss.

The torque level at which slip impends can be empirically measured or calculated in accordance with Reference (3), supra, or as summarized in References (5) and (6).

Whatever the methodology for determining the onset of slip, it always occurs first on the driven pulley (Reference 6) because within the practical geometry of a variable speed drive the driver pulley will support a larger coefficient of traction than the driven pulley when slip impends. This is why the driven pulley is considered the critical pulley in determining the onset of slip.

Whatever the pulley actuation system for opening and closing the pulley halves, all variable speed drives must have sufficient belt tension to insure the existence of a seating arc to prevent slip for all required power loads.

The drives have actuators incorporating springs, fly weights, hydraulics or the like, to apply axial force and tension the belt. High tension may significantly reduce expected belt life by overstressing the belt tensile member. Some pulley actuators modulate driven pulley axial force, and hence belt tension, by means of a constant angle torque ramp and spring, to reduce the axial force as the pulley halves are separated. However, drives with such actuators are overtensioned because belt tension from the generated axial forces are substantially greater than the belt tension required to prevent slip.

Not only must a variable speed V-belt drive be properly tensioned, it must also be stable. As explained by Gerbert in Reference (4) supra, at page 9, a helical torque ramp in combination with a spring requires a strong-load spring and a weak torque-ramp action to produce a stable drive and avoid the condition where the driven pulley has a tendency to upshift with decreasing engine speeds. As an example, Gerbert uses a spring that is approximately 88 percent of the maximum axial force and a torque ramp action that has a maximum output of 12 percent of the total axial force when operating at a speed ratio of 1:1. Thus, the prior art V-belt transmission systems have driven pulley actuators which overtension the V-belt and impair belt load carrying life.

SUMMARY OF THE INVENTION

In accordance with the invention, a V-belt driven transmission, method, and torque responsive pulley are provided for improved control of pulley axial forces and improved belt life. Under the method, an axial force profile for closing pulley halves together is determined for ideal conditions to establish an expected threshold between belt slip and acceptable belt creep. The axial force profile is based on an expected peak torque from a driver pulley. Various levels of axial force are interpolated between a zero force requirement at the driven pulley for zero torque and the maximum force profile for accommodating 100 percent peak torque. An axial force is then determined which follows generally decreasing axial force lines of the axial force profile. The required axial force at a maximum torque condition may then be set from about 100 to about 130 percent of ideal conditions, and more preferably to about 120 percent of ideal conditions, to ensure that the V-belt is tensioned in a reduced range for enhanced belt life.

A V-belt transmission system is provided where the driven pulley has an actuator with means for closing the driven pulley halves together at an axial force that is from about 100 to about 130 percent, and more preferably to about 120 percent, of the maximum required force as established by the method discussed above.

A stable belt drive with improved belt life is provided for a constant angle torque ramp and spring type actuator where the spring force is reduced to be less than the axial force contributed by the torque ramp. This is in a vehicle system where a reflective inertia at the driven pulley is at least 1, and more preferably, at least 11 times a reflective inertia at the driver pulley.

An actuator of the invention has a plurality of links that are arranged in generally "squirrel-cage, treadmill" fashion with one end portion of the links attached to the pulley shaft and another end portion of the links attached to the movable portion of the driven pulley whereby a relative rotation of the movable pulley half with respect to the shaft has the effect of either increasing the tension in the links, or "racking" the treadmill to pull the pulley halves together. The links may be in the form of rods, cables or cords.

One aspect of the invention is to provide a V-belt transmission system designed for enhanced belt life.

Another aspect of the invention is to provide a method for providing V-belt variable speed drives with improved belt life.

Another aspect of the invention is to provide a simplified pulley actuator which may also be used in conjunction with providing improved belt life.

These and other aspects and advantages of the invention will be more apparent after reviewing the drawings and description thereof wherein:

FIG. 12 is a partially, cross sectional cutaway side view of a pulley incorporating an actuator of the invention;

FIG. 13 is a broken away side view showing the actuator element of the invention;

FIG. 15 is a broken away side view similar to FIG. 13 showing another actuator element embodiment of the invention.

DESCRIPTION OF PREFERRED EMBODIMENT

Figure 1:
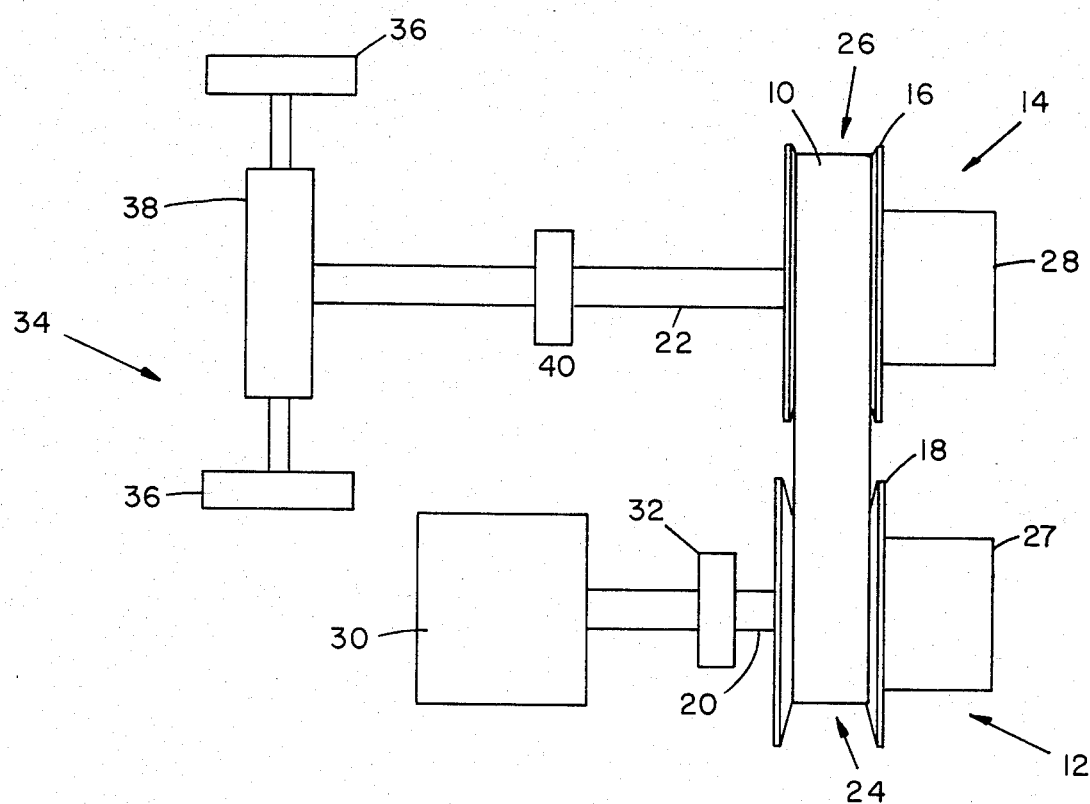
FIG. 1 is a schematic of a variable speed belt transmission according to this invention showing its interrelationship to a power source and a vehicle type driven means with the transmission at a maximum (speed down) ratio where the driver pulley halves are axially separated to a full open position and the driven pulley halves are positioned axially together to a full closed position.

Major V-belt manufacturers, variable speed drive manufacturers, and others skilled in the V-belt art have digital or analog computer programs that model variable speed belt drives. The programs are useful tools for predicting, analyzing, and designing variable speed belt drives. While all such programs are not the same because of different emphasis placed on items such as coefficients of an equation, all must include an analysis that considers driver pulley axial forces, driven pulley axial forces, V-belt tight side tension, V-belt slack side tension, V-belt size, pulley diameters for some speed ratio, pulley center distance, and some maximum or peak torque load at the driver pulley. Absent a computer program, several references are available for analyzing the interrelationship of such parameters. For example, Reference (4) supra, gives a good mathematical analysis of variable speed belt drives and is included in the file history hereof. Some of the charts shown herein are developed with the aid of a computerized mathematical model of variable speed belt drives.

Method

Referring to FIGS. 1-8, a V-belt 10 is entrained by a driver 12 and driven 14 pulleys with each pulley having an axially separable pulley half. At least one pulley half 16, 18 of each pulley is axially movable along a shaft 20, 22 from a full open position 24 where the pulley halves have maximum axial separation, to a full closed position 26 where the pulley halves are close together. The movable pulley half may be controlled from the full open to the full closed position by a variety of actuator means 27, 28 such as a spring, centrifugal weights, a spring torque ramp combination, or hydraulic piston. The other pulley half is commonly fixed to the shaft. As previously mentioned, the prior art is replete with examples of actuators. Whatever the actuator, it must have requisite characteristics in accordance with this invention which will later be explained.

Figure 2:
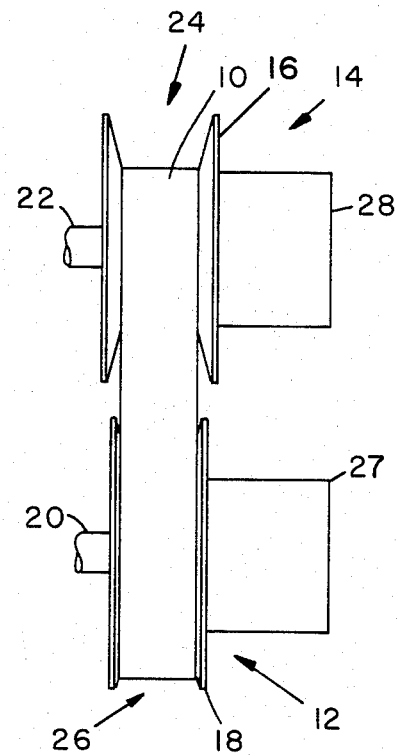
FIG. 2 is a schematic of a variable speed V-belt transmission at a minimum (speed up) ratio where the driver pulley halves are axially together to a full closed position and the driven pulley halves are axially separated to a full open position.
Figure 3:
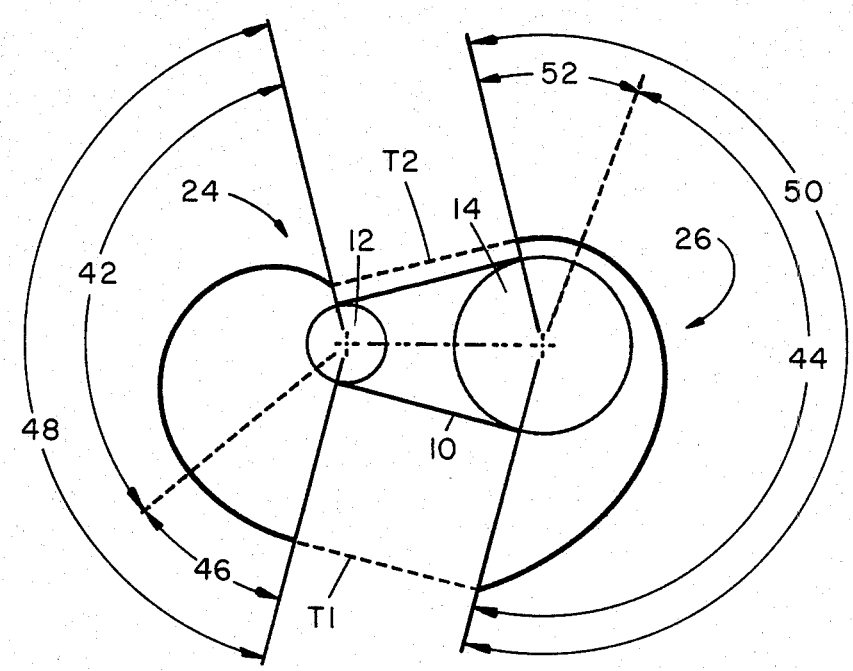
FIG. 3 is a schematic side view showing the pulleys position at a maximum (speed down) ratio with a radial plot of local belt tensions superimposed around the driver and driven pulleys.
Figure 4:
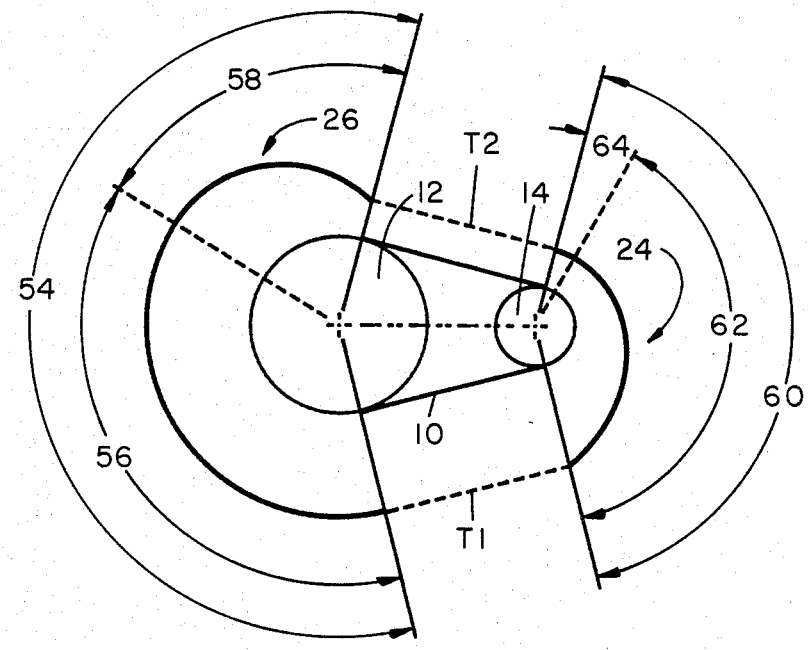
FIG. 4 is a view similar to FIG. 3 showing the pulleys positioned at a minimum (speed up) ratio with a radial plot of local belt tensions superimposed around the driver and driven pulleys.

The position of the pulley halves vary from a (1) maximum (speed down) ratio where the driver pulley halves are axially separated to a full open position and the driven pulley halves are positioned axially together to a full closed position, FIGS. 1 and 3, to a (2) minimum (speed up) ratio where the driver pulley halves are axially together to a full closed position and the driven pulley halves are axially separated to a full open position, FIGS. 2 and 4.

The driver pulley is powered by some source 30 which has a peak or maximum torque output capability such as an internal combustion engine. Various mechanisms 32 such as gearing and clutches may be interpositioned between the power source and driver pulley. The source has the characteristic of increasing or decreasing the input torque to the driver pulley.

The driven pulley 14 powers a work load 34 at some torque and speed. For example, the driven pulley may power the drive wheels 36 of an automotive vehicle through a differential 38. In such a case, the torque load at the driven pulley is subject to constant change. Various mechanisms 40 such as a transmission or clutch may be interpositioned between the driven pulley and its power load. Such devices may influence the torque levels seen at the driven pulley.

Of course, the size of the variable speed belt drive system depends on its application. Once the maximum input peak torque is determined at the driver pulley, the diameters of the driver and driven pulley, center distance between pulleys, belt size and speed ratio are established in accordance with accepted standards in practice. For example, a variable speed belt drive may be chosen to have the following characteristics:

EXAMPLE 1

| | |
|---|---|
| Peak torque | 107.1 lb.-ft. |
| Driver pulley pitch diameter | 9.8 in max.; 4.4 in min. |
| Driven pulley diameters | 9.8 in max.; 4.4 in min. |
| Center distance | 10.89 in. |
| Belt length | 44.75 in. |
| Pulley groove angle | 30° |
| Speed variation | 4.96 (2.23 speed down, 0.45 speed up) |

For whatever chosen physical limitations, power at some peak torque at the driver pulley is transmitted to the driven pulley by means of the belt. As with all V-belt drives, power is transmitted between driver and driven pulley by means of belt tension where $T_1$ is commonly referred to as the tight side belt tension and $T_2$ is commonly referred to as belt slack side tension. The difference between $T_1$ and $T_2$ ($T_1 - T_2$) is representative of a force that is acting at a changing pulley radius for transmitting torque at the driver and driven pulleys. FIGS. 3 and 4 have superimposed radial plots of belt tension at the driver and driven pulleys. Belt tension distribution is drastically different between the driver and driven pulleys even though both pulleys are exposed to the same tight side and slack side belt tensions. Belt tension at the driver pulley remains high substantially throughout the total arc of contact from the point where the belt enters the pulley to the point where the belt exits the pulley as it is released to the slack side tension. However, belt tension at the driven pulley does not rapidly increase to and substantially remain at high level throughout the total arc.

There is a portion of the total arc of contact at the driver, driven pulleys where the belt "seats" into the pulley. This is commonly referred to as the "seating arc" and may vary from drive to drive. Minimum seating arcs from about 10 degrees to about 20 degrees are normally required. After seating, belt tension at the driven pulley increases somewhat gradually through the remaining arc of contact until the point that the belt exits the driven pulley. Comparatively, belt tension at the driver pulley remains high after seating.

Referring to FIG. 3 showing a speed down case, the driver pulley active arc 42 is substantially less than the driven pulley active arc 44. However, the driver pulley has a large seating arc 46 (i.e., greater than 20 degrees) which is more than enough to prevent slip even when the total arc 48 of the driver pulley is at its smallest. Comparatively, the driven pulley total arc 50 is very large so that even with a large active arc 44, there is a sufficiently large seating arc 52 (i.e., greater than 20 degrees) to prevent slip at high traction ratios (i.e., greater than 0.85).

For the speed up case, FIG. 4 shows that the total arc 54 on the driver pulley is so large that the seating arc 56 is greater than the active arc 58, clearly preventing slip. The driven pulley total arc 60 is so small (i.e., compared to arc 50) that it is necessary to keep the traction ratio much lower (i.e., below 0.65) to allow a minimum seating arc 64 from about 10° to about 20° for active arc 62 to prevent slip. This inherent difference in the extent of the active arc on the driven and driver pulleys makes the driven pulley the critical pulley where slip will first impend for all practical variable speed drive configurations.

Figure 5:
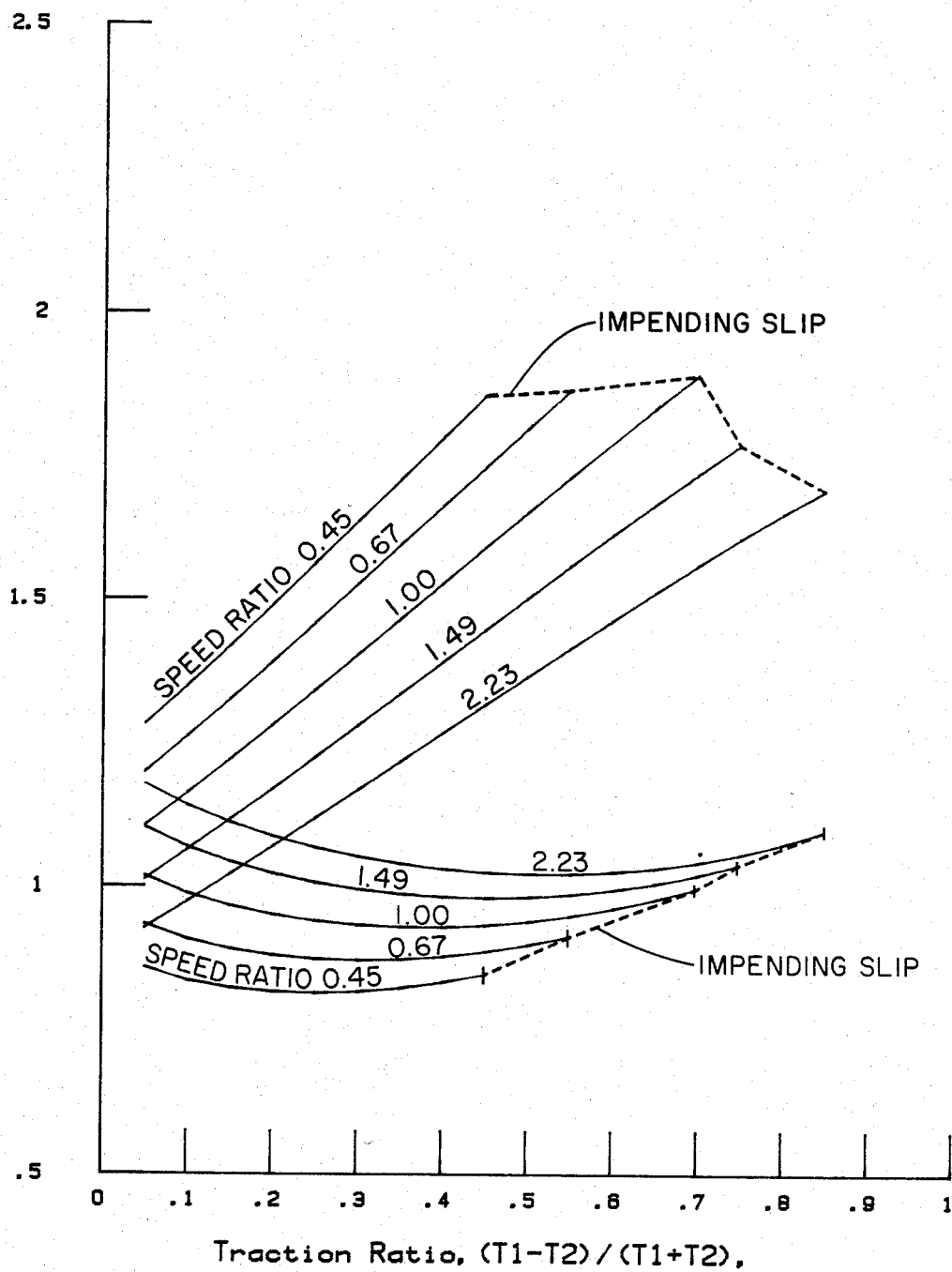
FIG. 5 is a chart showing interrelationships between traction ratio, dimensionless axial force, speed ratio, and impending slip for an exemplary variable speed belt drive.

Power is only transmitted between the pulleys when there is a difference between tight side and slack side belt tension ($T_1-T_2$) to generate a belt tension acting at some radius to produce a torque. Axial forces F must be provided at the movable pulley halves to generate the belt tensions. FIG. 5 charts the interrelationship for driver and driven pulley axial forces, tight side and slack side belt tensions, and speed ratio for the belt drive listed in example 1. Dimensionless axial force, scaled on the ordinate, is the ratio of axial force, F, to total drive tension ($T_1+T_2$). Traction ratio (sometimes referred to as the coefficient of traction, Reference 4, supra scaled on the abscissa, is the ratio of ($T_1-T_2$) i.e., net force available to transmit torque, to total drive tension ($T_1+T_2$). Speed ratio is defined as the ratio of driver pulley rpm to driven pulley rpm. The driven pulley dimensionless axial forces fall in a somewhat narrow band that is generally parallel to the traction ratio abscissa for all speed ratios. Thus, driven pulley dimensionless axial force is substantially constant for all drive torques (from a traction of zero to a traction ratio of about 0.85). Accordingly, the driven pulley axial force can be thought of as setting the drive tension in such a manner that it establishes total drive tension for all ranges of torque. Comparatively, the required axial forces at the driver pulley increase with traction ratio and decreasing speed ratio.

For any given drive, such as that established by Example 1, a minimum seating arc to prevent slip may be calculated in accordance with a method discussed by Reference (4) supra, or the point of impending slip may be measured through laboratory testing. The point at which impending slip occurs may be superimposed on the traction ratio chart, FIG. 5, to give a pictorial representation of the sensitivities between the driver and driven pulley. As seen, belt slip does not occur at traction ratios at about 0.65 to about 0.85 from the maximum speed ratio of 2.23 to a speed ratio of about 1:1 and thereafter traction ratio decreases to about 0.45 because the seating arc of from about 10 degrees to about 20 degrees comprises an increasingly larger percentage of the total contact arc at the driven pulley at the minimum (speed up) ratio, leaving too little active arc to support a traction ratio above 0.65.

Thus, an ideal axial force line at the driven pulley can be determined from the various input torques associated with the maximum torque of the driver pulley. Torque varies between a fixed value of ($T_1-T_2$) because the radius varies between the driver and driven pulleys as the various speed ratios are effected. For example, assumed driver pulley torque of 107.1 lb.-ft. is transmitted to the driven pulley at a 1:1 speed ratio. Torque is 238.5 lb.-ft. at the maximum speed ratio and 48.1 lb.-ft. at the minimum speed ratio where the total variation of assumed speed ratio is 4.96.

Figure 6:
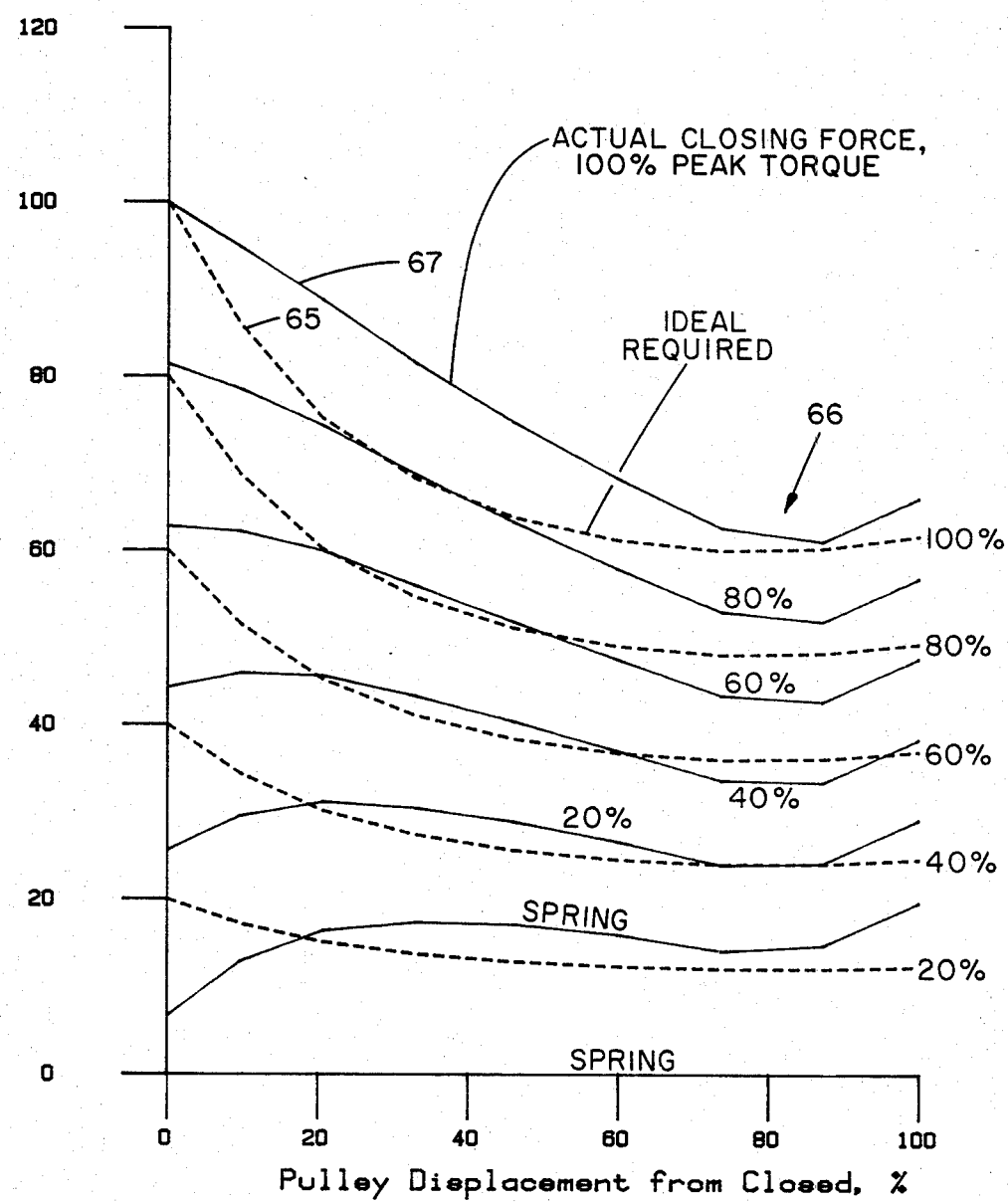
FIG. 6 is a chart showing the interrelationship between driven pulley axial force, speed variation (separation of the driven pulley halves), and driver pulley peak torque for an exemplary variable speed V-belt drive of the invention.

An ideal axial force line is determined for the driven pulley for any specific torque value at the points, or locus of points, where slip is impending (i.e., at traction ratios from about 0.65 to about 0.85 from the maximum speed ratio to the 1:1 speed ratio and wherein the seating arc is from about 10 degrees to about 20 degrees from the speed ratio of about 1:1 to the minimum speed ratio). Traction ratios above 0.85 are avoided because they have the affect of decreasing efficiency of the drive. The ideal axial force line generally decreases from the driven pulley full closed position to the driven pulley full open position. Such an ideal axial force line 65 is shown on FIG. 6 for the drive limitations of Example 1. There is an increase 66 in the ideal axial force near 100 percent open because the seating angle comprises a larger percentage of the total available belt arc. An extended family of axial force lines shown in dotted form is interpolated from zero axial force to the maximum ideal axial force line. As shown on FIG. 6, the lines are at 20 percent increments and correspond to 20 percent increments of maximum input driver pulley torque. FIG. 6 shows that theoretically, no driven pulley axial force is required at zero torque conditions.

The driven pulley actuator axial closing forces are shaped to define a family of closing forces that generally follow the ideal decreasing force lines in such a manner that axial closing force 67 for peak torque is from about 100 to about 130 percent of the ideal axial force peak line. More preferably, the actuator force is from about 100 to about 120 percent of the ideal axial force peak torque line as shown in FIG. 6 where the actual actuator force is no more than about 115 percent of the ideal actuator force line. Such a shaping improves belt life by minimizing belt tensions from that induced with prior art driven pulley actuators. Such a shaping defines a torque sensing driven pulley that enhances belt life.

For better belt performance, care is used in shaping the actuator closing forces so that the lines generally follow the required or ideal lines. For example, the axial force lines at the lower torque levels also generally follow the decreasing characteristic of the maximum axial force line. For close tailoring the actuator force line may generally increase 66 near the 100 percent full open position in a manner similar to the ideal line. Theoretically hydraulic actuators, electrical actuators, or mechanical actuators could be used to produce force lines that overlie the ideal force lines. However, such exact shaping is not necessary to realize improved belt life. However, when a straight mechanical torque sensing pulley is used in conjunction with a spring, the effect of the spring must be considered. In the example of FIG. 6, a spring having a generally negative spring rate is used. Force generated by the spring is the axial force line at zero percent. In the mechanical device, some force is needed to close the pulleys. The negative rate spring has the effect of keeping the various levels of torque lines in a generally decreasing manner. For example, the generally decreasing torque may be characterized by the following Table I as noted from the information contained in FIG. 6:

Table I 80 percent torque level

The generated actuator force line for 80 percent is above the corresponding 80 percent ideal required force line.

60 percent torque level

The generated actuator force line for 60 percent torque is above the corresponding 60 percent ideal required force line.

40 percent torque level

The generated actuator force line for 40 percent torque touches the corresponding 60 percent ideal required force line from about 30 to about 60 percent of the open position.

20 percent torque level

The 20 percent generated actuator force line for 20 percent torque is above the corresponding 40 percent ideal required force line from about 25 to 100 percent of the open position.

0 percent generated torque level

The 0 percent generated actuator force line is above the corresponding 20 percent ideal required force line from about 20 to 100 percent of the driven pulley full open position.

In summary, the family of generated driven pulley axial force lines have profiles spaced at 20 percent increments, the family of required driven pulley axial forces have corresponding profiles spaced at 20 percent increments, and the generated forces for any 20 percent increment profile exceeds a corresponding required 20 percent increment profile by less than two successive 20 percent increment levels of required force. Since some of the generated 20 percent profiles barely overlap the required 20 percent profiles, the closeness may be summarized by the generated axial forces for any 20 percent profile exceeding a corresponding required 20 percent profile from about zero to about one successive increment level of required force.

Figure 7:
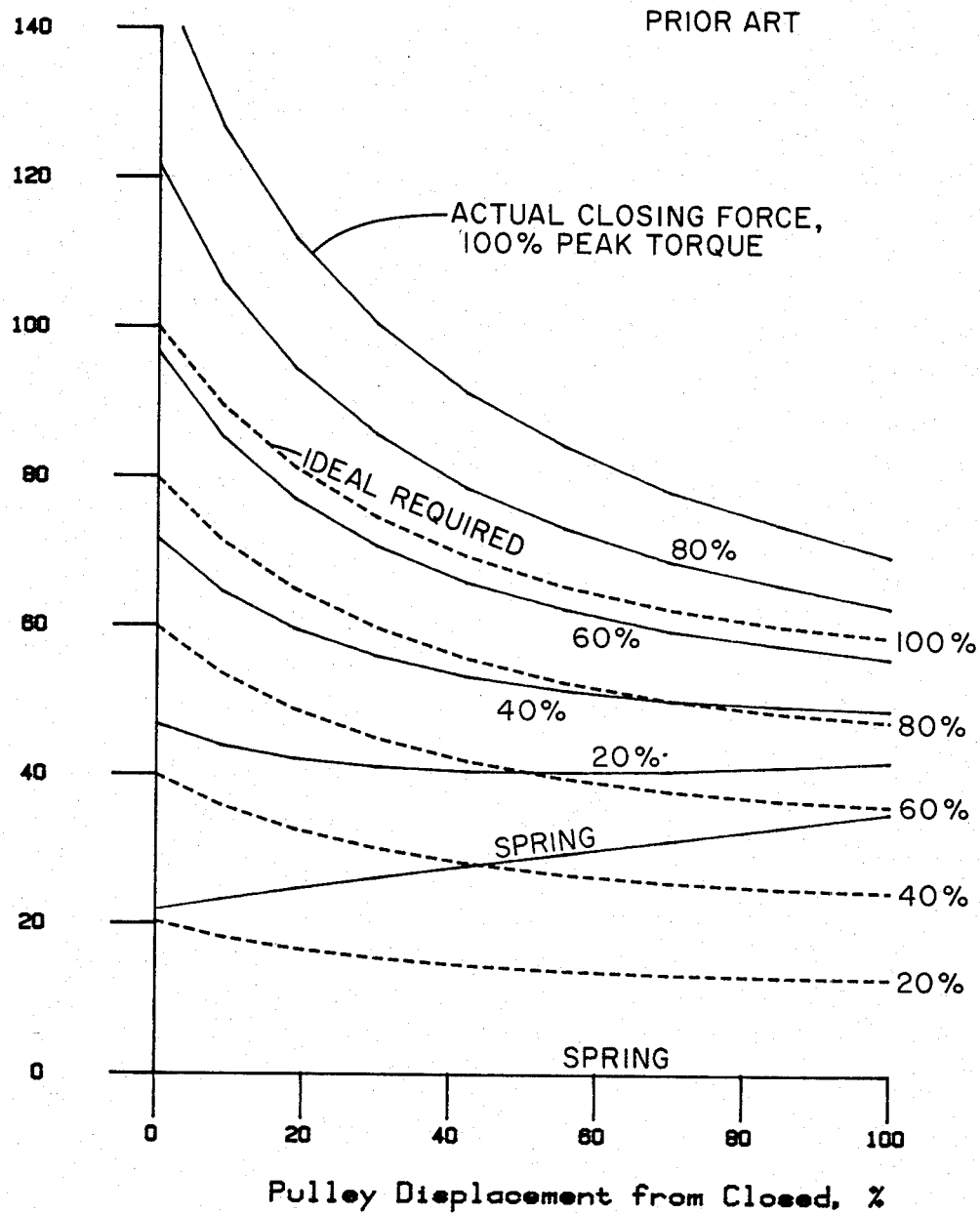
FIG. 7 is a chart similar to FIG. 6 showing interrelationships between pulley axial force, speed variation, and driver pulley peak torque for a variable speed V-belt drive with a driven pulley of the constant torque ramp/spring type.

FIG. 7 illustrates axial forces generated by a prior art torque sensing actuator having a constant angle helical torque ramp and spring which controls the movable pulley half. The belt drive design conditions are for a known snowmobile. The required axial force lines are similar to those of FIG. 6. The constant angle helical torque ramp provides a generally decreasing axial force line shape. The relative forces provided by the spring and torque ramp is scaled from a snowmobile actuator where the spring provides about 50 percent of the closing force at the driven pulley full open position. However, the closing spring is so strong that it provides over 50 percent of the required axial force (i.e 35 lbs. of a required 60 lbs.) at the driven pulley full open position or 58 percent. The large spring force is presumably required to enhance shift stability for reasons as described by Gerbert Ref. (4) supra. However, the large spring force has the affect of over tensioning the belt about 50 percent (i.e., 150 percent of the ideal required force) at the driven pulley closed position and about 16 percent (i.e., 116 percent of the ideal required force) at the driven pulley open position. The degree of over tensioning is characterized by the following Table II.

Table II 80 percent torque level

The generated actuator force line for 80 percent is above the correspinding 100 percent ideal required force line.

60 percent torque level

The generated actuator force line for 60 percent torque is above the corresponding 80 percent ideal required force line.

40 percent torque level

The generated actuator force line for 40 percent torque is above the corresponding 60 percent ideal required force line and is above the 80 percent ideal required force line from about 70 to 100 percent of the open position.

20 percent torque level

The 20 percent generated actuator force line for 20 percent torque is above the corresponding 40 percent ideal required force line and above the 60 percent required ideal force line from about 50 to 100 percent of the open position.

0 percent generated torque level

The 0 percent generated actuator force line is above the corresponding 20 percent ideal required force line and above the 40 percent ideal required force line from about 45 to 100 percent of the driven pulley full open position.

Figure 8:
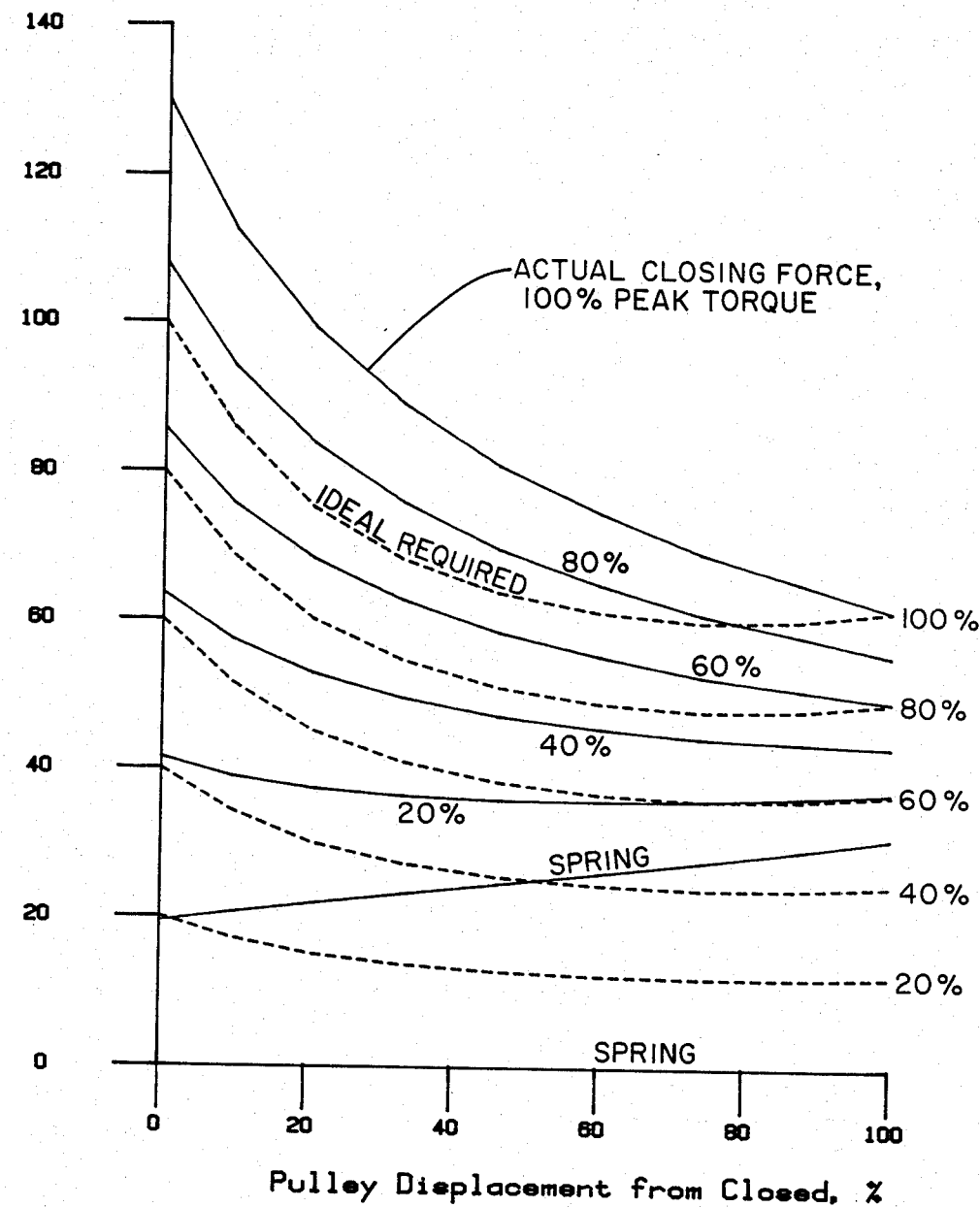
FIG. 8 is a chart similar to FIG. 7 showing interrelationships between pulley axial force, speed variation and driver pulley peak torque for a prior art variable speed V-belt drive with a driven pulley of the constant torque ramp/spring type where the spring is assumed to provide about 50 percent of the required driven pulley axial force.

FIG. 8 illustrates axial forces generated by a torque sensing actuator having a constant helical torque ramp and spring which controls the movable pulley half. The belt drive design conditions of FIG. 8 are the same as for Example 1 so that the required axial force lines are the same as those of FIG. 6. The constant angle helical torque ramp provides a generally decreasing axial force line shape that generally follows the 100 percent torque level line. However, the generated axial force has no detail shaping to follow the increasing ideal line near 100 percent open. The generated axial force must be high enough so that belt slip does not occur at the 100 percent open position; therefore, the 100 percent generated force line is located such that it just touches the required curve at the 100 percent position. This displaces the curve at the zero percent open position so that the generated force is about 130 percent of the required force at the driven pulley closed position. Thus, the generated axial force is substantially 30 percent higher than the required force level.

Some type of spring mechanism must be used with the helical ramp to close the pulley halves together. The spring force is positioned to be about 50 percent of maximum at the full closed position even though Gerbert Ref. (4) supra, indicates that the spring force should be about 88 percent of the total force to promote drive stability and the example of FIG. 7 indicates a spring force that is about 58 percent of the required force.

The amount of spring force is shown on the zero percent generated line. The positive rate spring affects the shaping of the intermediate axial force levels and makes the lower force levels generally increase rather than generally decrease. The effect is to overtension the belt throughout the actuator force ranges. This is illustrated by the following Table III.

Table III 80 percent torque level

The generated actuator force line for 80 percent torque is above the corresponding 100 percent ideal required force line up to 75 percent open.

60 percent torque level

The generated actuator force line for 60 percent torque is above the corresponding 80 percent ideal required force line.

40 percent torque level

The generated actuator line for 40 percent torque is above the corresponding 60 percent required force line.

20 percent torque level
The generated actuator force line is above the corresponding 60 percent required force line from 75 to 100 percent open.

0 percent torque level
The generated actuator force line is above the corresponding 40 percent required force line from 60 percent to 100 percent open and above the 20 percent required force line from 0 to 100 percent open.

Figure 9:
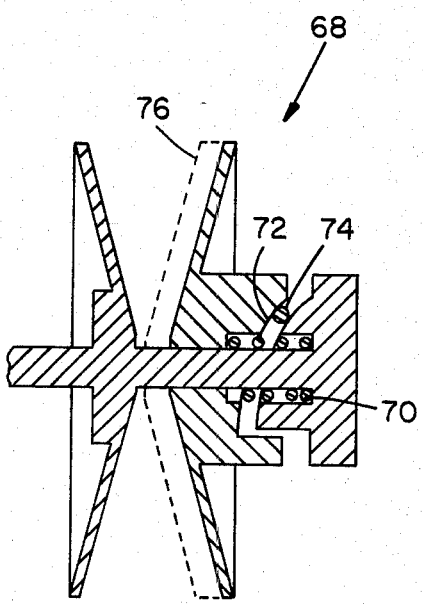
FIG. 9 is a schematic of a prior art actuator of the constant torque ramp, spring type.

When the figures of Table II are compared to those of Tables I and III, it is seen that the actuator generated forces of the invention are substantially less than those of a prior art actuator having a constant angle helical torque ramp and spring where the spring provides about 58 percent of the total force. An example of a prior art actuator 68 having a spring 70 and a constant angle helical torque ramp 72 is shown in FIG. 9. The position of the movable pulley half and its axial force is controlled by the helical torque ramp and spring. As the movable pulley half rotates relative to the fixed pulley half, it moves axially to a position controlled by the torque ramp 72 and follower 74. The spring biases the movable pulley half to close 76 the pulley.

Apparatus

Figure 10:
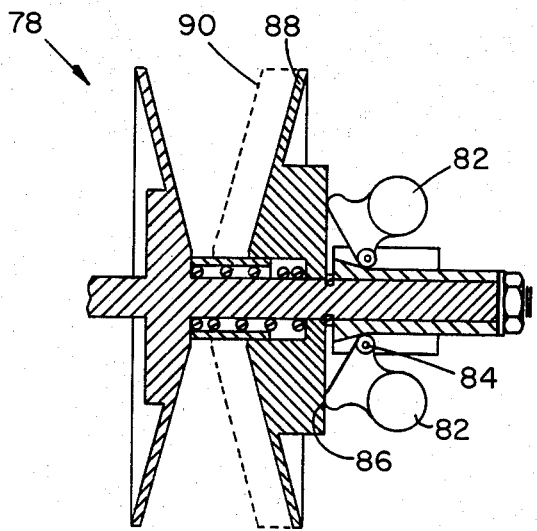
FIG. 10 is a schematic of a prior art actuator of the centrifugal type.
Figure 11:
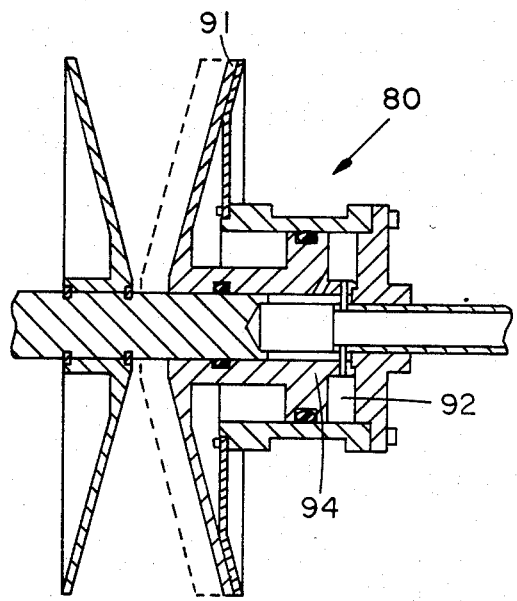
FIG. 11 is a schematic of a prior art actuator of the hydraulic type.

The apparatus aspects of the invention substantially follow the teachings of the above described method. The drive system has a driver pulley and torque sensing driven pulley where both pulleys have at least one movable pulley half that is axially positioned by means of an actuator to effect a desired speed ratio. Any desired type of actuator may be used at the driver pulley such as a centrifugal weight actuator 78 shown in FIG. 10 or a hydraulic actuator 80 as shown in FIG. 11. In the centrifugal type actuator, fly weights 82, pivot 84 and move outwardly with increasing rotational speed to press 86 against the movable pulley half 88. Movement 90 toward the fixed pulley half effects a desired movable pulley half position with respect to speed. The system must provide sufficient axial force to avoid slip as shown by FIGS. 6 and 8. As explained with the method, the driven pulley is the critical pulley at which belt slip will occur once sufficient axial force and torque is supplied at the driver pulley.

The hydraulic actuator 80 as shown in FIG. 11, can be used to position a movable pulley half 91 by adjusting the hydraulic pressure 92 that acts against a movable piston 94 that connects with the movable pulley half.

In accordance with the invention, the driven pulley has a means for closing the pulley halves together while generating a family of axial closing forces that generally follow the decreasing force lines of the required driven pulley axial forces. The forces generated by such means are such that at the 100 percent peak torque line, the generated forces range from about 100 to about 120 percent of the maximum required driven pulley axial force and more preferably about 115 percent as is exemplified by FIG. 6. Also, the axial forces for intermediate torque level force are generally decreasing to substantially reduce belt tension for increased belt life.

The driven pulley actuator may be of the hydraulic type as shown by FIG. 11 provided that the hydraulic pressure is controlled so the generated forces follow the ideal decreasing force lines.

Actuator

While different types of actuators may be used to sense torque at the driven pulley and provide a means for generating generally decreasing axial force lines, FIG. 12 exemplifies another aspect of this invention which is an actuator having the requisite means for delivering axial force in accordance with the required force lines. Referring to FIGS. 12 and 13, a driven pulley 100 has a fixed pulley half 102 that is coaxial with and fixedly attached to rotate with a shaft 104. A movable pulley half 106 is coaxial with the shaft and is free to both rotate with the shaft and axially move on the shaft toward and away from the fixed pulley half on bearings 108, 110. The movable pulley half is controlled by an actuator 112 that has a plurality of substantially parallel circumjacent links 114 in the form of cords or cables. The cords are arranged in a somewhat "squirrel cage, treadmill" fashion so that end portions of the cords are radially spaced from the shaft at some desired radius. As an example, twenty-four 60 gauge aramid fiber cords encapsulated with an elastomeric sheath may be used for links. The locus of cords forms a hyperboloid of revolution. One end portion of the cords is fixed in relation to the shaft such as by means of a plate 116 that is attached to the fixed pulley half 102. The other end portion of the cords is attached to the movable pulley half such as by means of a plate 118. When the movable pulley half is rotated with respect to the fixed pulley half on the shaft, the cords somewhat "wind up" 120 shortening the axial distance 122 beteen the pulley halves.

Preferably, one of the plates 116, 118 is "pre-rotated" through an angle from about 30 to about 70 degrees so that the cords form an angle 124 with the shaft, and more preferably, the plate is rotated through an angle of about 50 degrees. The pre-rotation affects shaping of the decreasing force lines. Increasing angles of pre-rotation have the affect of decreasing the axial force lines. Of course, smaller angles of pre-rotation have the opposite effect.

A spring 126 between the shaft and movable pulley half, provides a means for biasing the pulley half toward the fixed pulley. Preferably, the spring has a negative spring rate so that the force generated by the spring is not increased proportional to axial displacement of the movable pulley half. The force characteristic of a spring having a negative rate (e.g., a bellville spring 126) is exemplified by the zero percent generated force line of FIG. 6.

In operation, the wedging action of a V-belt operates to spread the pulley halves apart by displacing the movable pulley half. This has the effect of tensioning the cords. The actuator, being attached to the movable pulley half, performs two functions; it either increases tension in the cords to support increased belt tension with no pulley half movement, or it permits rotation of the cords to the point where belt tension is balanced against cord tension and the movable pulley half is displaced 128. If the cords are just tensioned, the axial force generated increases and there is no movement of the movable pulley half towards the fixed pulley half. However, if the sensed torque is such that the movable pulley half may rotate with respect to the fixed pulley half, the cords are angularly rotated shortening the distance between the pulley halves which has the effect of changing the drive system speed ratio. As plates 116, 118 are rotated relative to each other from about 30 to about 140 degrees, the ends of the cords are arcuately displaced, the radius 127 between the cords and the shaft becomes smaller and the angle 128 between the cords and the shaft becomes larger.

Figure 14:
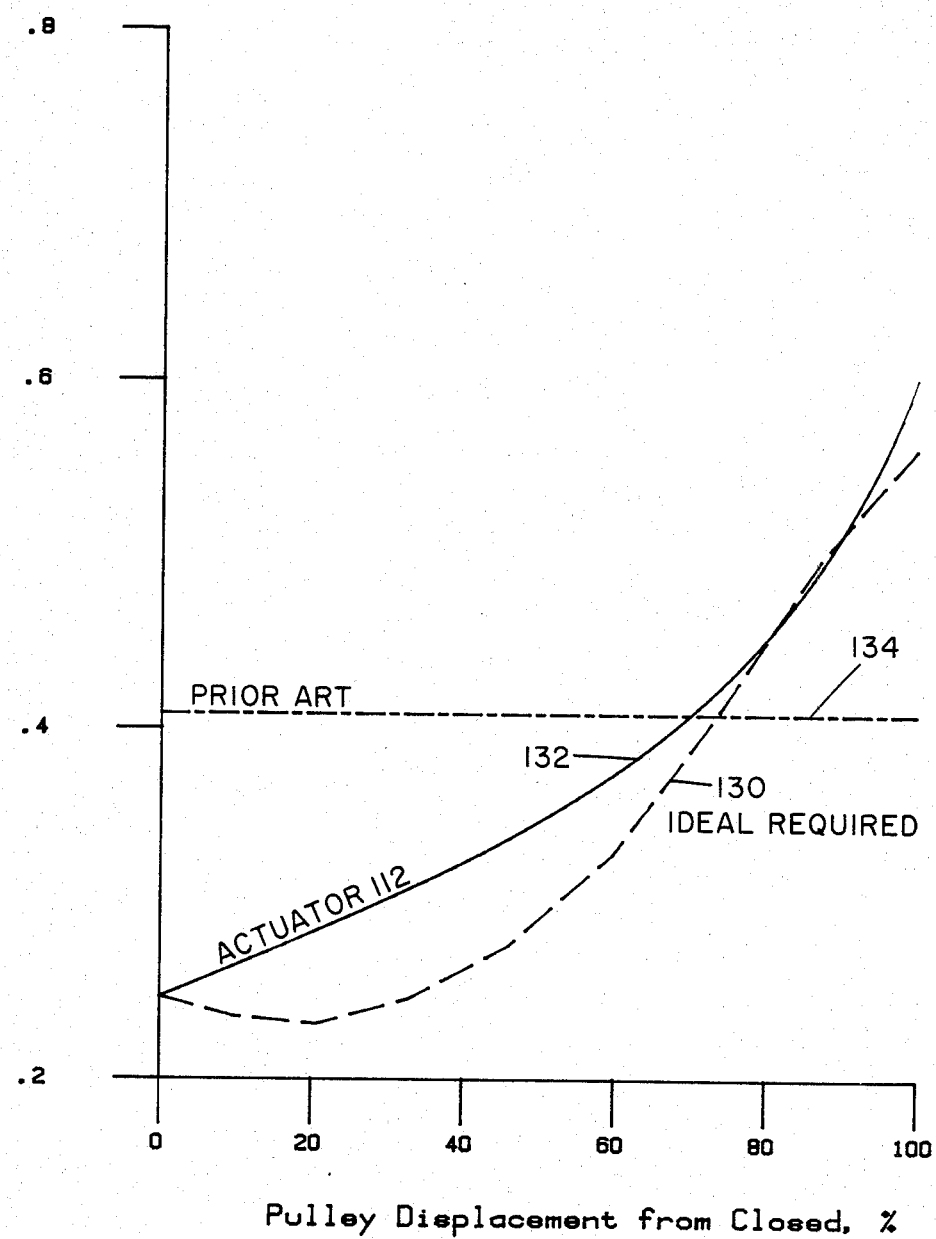
FIG. 14 is a view showing the sensitivity of torque ramps for an actuator of the invention in comparison to that required for an exemplary variable speed V-belt of the invention and in comparison to a prior art, constant angle helical torque ramp.

Referring to FIG. 14, the ideal torque ramp rate 130, expressed as the ratio of axial force to torque, for the conditions of Example 1 is shown as a function of the driven pulley opening from full closed to, full open. The actuator 112 provides a torque ramp rate 132 that generally follows the ideal rate when the ends of the circumjacent cords are located at a 1.76 in radius and pre-rotated 50 degrees. Comparatively, the torque ramp rate 134 for a constant angle helical angle torque ramp does not vary between the driven pulley full closed and open positions.

Thus, for increasing angles 128 and radii 127, the axial force generated by the actuator 112 substantially decreases. When this force is plotted in conjunction with the negative rate spring, the actuator delivered forces are such as that depicted on FIG. 6 using the variable speed belt drive designed limitations given by Example 1 and a "pre-rotation" angle of 50 degrees. Note that the link type actuator provides generally decreasing force lines over most of the actuator displacement, and that the spring provides an increase in force near 100 percent open to somewhat match the increase if force for the ideal condition. Because of this, the close tailoring of the generated to the required is achieved for enhanced belt life.

A transmission of the type described using a "link" type actuator of FIGS. 12 and 13, was installed and tested in an automobile weighing 2,500 lbs. having an internal combustion engine delivering 107.1 lb-ft. of peak torque to the driver pulley. The reflected inertia at the driven pulley was 2.184 slug ft$^2$ and the reflected inertia at the driver pulley was 0.191 slug ft$^2$. The transmission was stable in its shifting pattern over all speed ranges even though the driven pulley had a spring that contributed less than 25 percent of the closing force at the driven pulley full closed position. The shifting stability is believed to be attributable to the inertia ratio at the driven and driver pulley which was about 11:1 (e.g., 2.184 slug ft$^2$ to 0.191 slug ft$^2$). It is believed that stability is achievable as long as the ratio is greater than 1:1.

Referring to FIG. 15, an actuator 132 is shown which has substantially the same features and mode of operation as the actuator 112 of FIGS. 12 and 13. However, rods 134 are used instead of cords 114 as the links. One end portion of the rods is fixed in relation to the shaft 104 by means of a plate 136 that is attached to the fixed pulley half. The other end portion of the rods is attached to the movable pulley half such as by means of a plate 138. The rods are attached to the plates with means such as tie rods 140 that accommodate angular and twisting movements.

Additional Species

Figure 16:
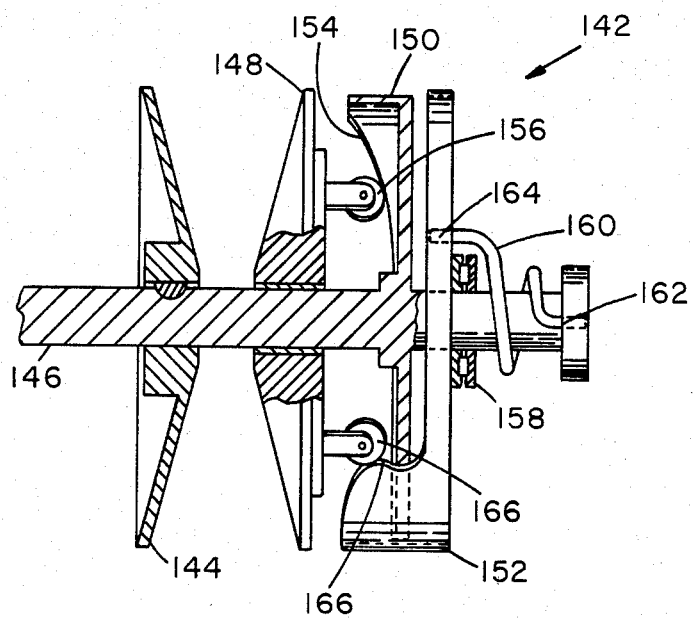
FIG. 16 is a partially cutaway, cross sectional side view showing another embodiment of an actuator of the invention.

Referring to FIG. 16, another actuator 142 of the invention is shown which has the requisite means for providing the generally decreasing axial forces so that they are within the requisite tolerances for improved belt life. This actuator has a "tapered" cam so that the axial forces are adjusted in accordance with the position of the movable pulley half.

The pulley has a fixed pulley half 144 that is coaxial with and fixedly attached to rotate with a shaft 146, a movable pulley half 148 is coaxial with and free to both rotate and axially move on the shaft toward and away from the fixed pulley half. Two cams 150, 152 control the axial force and positioning of the movable pulley half. The first or fixed cam 150 is attached to rotate with the shaft and has a profiled surface 154 that is engaged by a follower 156 attached to the movable pulley half. The second or free cam 152 is free to rotate relative to the shaft against a thrust bearing 158. The angular position of the free cam is biased by means of a helical type spring 160 having one end 162 attached to the shaft and its other end 164 attached to the free cam. The free cam has an undercut, or negative rate profiled surface 166 that is engaged by a follower 166 attached to the movable pulley half.

The free and fixed cams cooperate in shaping the axial force to have a generally decreasing valve as previously discussed. The free cam contributes an axial force component of a negative rate spring.

The foregoing detailed description is made for illustration only and is not intended to limit the scope of the invention which is to be determined from the appended claims.

What is claimed is:

1. In a variable speed belt drive system of the type with a driver pulley having axially separable pulley halves; a driven pulley having axially separable pulley halves responsively operable to axial forces variable with rotational torque for closing the driven pulley halves together; a V-belt entrained by the driver and driven pulleys, the driven pulley axial forces and driver pulley cooperatively causing variable belt tensions for transmitting predetermined power loads between the driver and driven pulleys from (1) a maximum (speed down) ratio where the driver pulley halves are axially separated to a full open position and the driven pulley halves are axially together to a full closed position to a (2) a minimum (speed up) ratio where the driver pulley halves are axially together to a full closed position and the driven pulley halves are axially separated to a full open position; and a family of ideal driven pulley axial force lines, each force line of the family corresponding to a specific torque value expressed as a percentage of the maximum input torque at the driver pulley, each force line representing, for its specific torque value, the locus of points where slip is impending between the belt and driven pulley for corresponding maximum input torques at the driver pulley between the minimum ratio and the maximum ratio, the force lines generally decreasing from the driven pulley full closed position to the full open position, the improvement comprising:

an actuator means for closing the driven pulley halves while generating an operating family of axial closing forces that follow the ideal force lines of the required driven pulley axial forces to the extent that the maximum generated axial force to close the driven pulley at 100 percent peak input torque exceeds the ideal force by no more than 120 percent.

2. The variable speed belt drive system as claimed in claim 1 wherein the driven pulley closing means includes a biasing means that contributes no more than about 25 percent of the maximum force generated by the driven pulley closing means at 100 percent peak torque.

3. The variable speed drive system as claimed in claim 2 wherein the biasing means is a spring having a negative rate.

4. The variable speed drive system as claimed in claim 1 wherein the maximum generated axial force to close the driven pulley is from about 100 to about 115 percent of the maximum required driven pulley axial force.

5. The variable speed drive system as claimed in claim 1 wherein the family of generated driven pulley axial forces have profiles spaced at 20 percent increments, and the family of required driven pulley axial forces have corresponding profiles spaced at 20 percent increments, the generated forces at any 20 percent increment profile exceeding a corresponding required force 20 percent increment profile by less than two successive 20 percent increment levels of required force.

6. The variable speed drive system as claimed in claim 5 wherein the generated axial forces at any 20 percent increment profile exceed a corresponding required 20 percent increment profile from about zero to about one successive increment level of required force.

7. The variable speed belt drive system as claimed in claim 1 wherein the means for closing the driven pulley halves together comprises:
- a rotatable shaft;
- one driven pulley half defining a fixed pulley half that is coaxially and fixedly attached to rotate with said shaft;
- one driven pulley half defining a movable pulley half that is coaxially and free to rotate and axially move in relation to said shaft;
- a plurality of substantially parallel circumjacent links having first and second end portions radially spaced from the shaft;
- a first means for attaching the first end portions of the links to the movable pulley half;
- an axially spaced second means for attaching the second end portions of the links to the shaft, the first attachment means, second attachment means and links positioned so that a rotation of the movable pulley half and first attachment means, relative to the shaft, shortens the axial space between the first and second attaching means so the movable pulley half is axially displaced toward the fixed pulley half; and
- a means for biasing the movable pulley half toward the fixed pulley half.

8. The variable speed belt drive system as claimed in claim 7 wherein the biasing means has a negative spring rate.

9. The variable speed belt drive system as claimed in claim 7 wherein the links are in the form of cords.

10. The variable speed belt drive system as claimed in claim 7 wherein the links are rods.

11. A variable speed pulley comprising:
- a rotatable shaft;
- a fixed pulley half that is coaxial and fixedly attached to rotate with said shaft;
- a movable pulley half that is coaxial and free to rotate with and axially move in relation to said shaft;
- a plurality of circumferentially spaced and similarly arranged flexible cord links, each substantially lacking in spring rate and having first and second end portions radially spaced from the shaft;
- a first means for attaching the first end portions of the cord links to the movable pulley half;
- an axially spaced, second means for attaching the second end portions of the cord links to the shaft, the first attachment means, second attachment means and cord links positioned so that a rotation of the movable pulley half and first attachment means, relative to the shaft, shortens the axial space between the first and second attaching means so the movable pulley half is axially displaced toward the fixed pulley half and wherein the first end portions of the cord links are pre-rotated along a circumference about the shaft from about 30 to about 70 degrees in relation to the second end portions; and
- a means for biasing the movable half toward the fixed pulley half.

12. The variable speed pulley as claimed in claim 11 wherein the biasing means has a negative spring rate portion.

13. A method for minimizing belt tension in a variable speed belt drive system of the type with a driver pulley having axially separable pulley halves; a driven pulley having axially separable pulley halves responsively operable to axial forces variable with rotational torque for closing the driven pulley halves together; a V-belt entrained by the driver and driven pulleys; the driven pulley axial forces and driver pulley cooperatively causing variable belt tensions for transmitting predetermined power loads between the driver and driven pulleys from (1) a maximum (speed down) ratio where the driver pulley halves are axially separated to a full open position and the driven pulley halves are positioned axially together by means of an actuator to a full closed position to (2) a minimum (speed up) ratio where the driver pulley halves are axially together to a full closed position and the driven pulley halves are axially separated to a full open position; the belt making a total arc of contact with the driven pulley, the total arc having a seating arc portion wherein the rate of belt tension increase with arc of contact is substantially zero; and the driven pulley halves are axially separated by means of the actuator to a full open position; comprising the steps of:
- determining the maximum input peak torque at the driver pulley;
- establishing a driver and driven pulley diameter and belt size and center distance between pulleys for a desired range of speed ratios;
- determining a family of driven pulley torques based on maximum input torque at the driver pulley and speed ratio;
- determining an ideal axial force line for the family of driven pulley torques at a traction ratio from about 0.65 to about 0.85 between maximum speed ratio and about 1.0 speed ratio, and a seating arc from about 10 degrees to about 20 degrees for speed ratios from about 1.0 to the minimum ratio;
- interpolating a family of axial force lines for the driven pulley from 0 to 100 percent of the line established for maximum axial force;
- whereby the family of ideal force lines is generally decreasing from the driven pulley full closed position to the driven pulley full open position;
- providing an actuator with axial closing forces that define a family of closing forces that follow the trend of the ideal decreasing force lines so that the actuator force line for peak torque is from about 100 to about 120 percent of the ideal axial force for peak torque; and
- separating the driven pulley halves and closing the driven pulley halves by means of the actuator in response to torque interaction of the belt and driven pulley.

14. The method as claimed in claim 10 comprising the additional step of determining a zero torque biasing axial force to close the driven pulley halves prior to the step of interpolating the family of axial force lines.

15. In a variable speed belt drive transmission for a vehicle, having vehicle inertia, powered by an engine, having engine inertia, the transmission of the type with a driver pulley having axially separable pulley halves; a driven pulley having axially separable pulley halves operated with an actuator that is responsively operable to axial forces variable with rotational torque for closing the driven pulley halves together, the actuator of the type with a torque ramp and closing spring; a V-belt entrained by the driver and driven pulleys, the driven pulley axial forces and driver pulley cooperatively causing variable belt tensions for transmitting predetermined power loads between the driver and driven pulleys from (1) a maximum (speed down) ratio where the driver pulley halves are axially separated to a full open position and the driven pulley halves are axially together to a full closed position to (2) a minimum (speed up) ratio where the driver pulley halves are axially together to a full closed position and the driven pulley halves are axially separated to a full open position; and a family of ideal driven pulley axial force lines, each force line of the family corresponding to a specific torque value expressed as a percentage of the maximum input torque at the driver pulley, each force line representing, for its specific torque value, the locus of points where slip is impending between the belt and driven pulley for corresponding maximum input torques at the driver pulley between the minimum ratio and the maximum ratio, the force lines generally decreasing from the driven pulley full closed position to the full open position, the improvement comprising:

an actuator means for closing the driven pulley halves including a first force means for generating a first tapered axial force component that exceeds the maximum ideal force by no more than 120 percent from the driven pulley full closed position to the driven pulley full open position and a second force means for generating a second axial force component that biases the movable pulley half toward the driven pulley full closed position, the second force component being less than the first force component at the driven pulley full open position and wherein the driver pulley is coupled to a first inertia reflective of the engine inertia and the driven pulley is coupled to a second inertia reflective of the vehicle inertia, the ratio of the second inertia to the first inertia being greater than 1 to 1 whereby responsiveness of the driven pulley is stable between the maximum speed ratios.

16. The variable speed belt drive transmission as claimed in claim 15 wherein the ratio is at least about 11 to 1.

17. The variable speed belt drive transmission as claimed in claim 15 the second force is less than 50 percent of the required axial force at the driven pulley full open position.

18. The variable speed belt drive system as claimed in claim 15 wherein the means for closing the driven pulley halves together comprises:
 a rotatable shaft;
 one driven pulley half defining a fixed pulley half that is coaxially and fixedly attached to rotate with said shaft;
 one driven pulley half defining a movable pulley half that is coaxially and free to rotate and axially move in relation to said shaft;
 a plurality of substantially parallel circumjacent links having first and second end portions radially spaced from the shaft;
 a first means for attaching the first end portions of the links to the movable pulley half;
 an axially spaced second means for attaching the second end portions of the cords to the shaft, the first attachment means, second attachment means and cords positioned so that a rotation of the movable pulley half and first attachment means, relative to the shaft, shortens the axial space between the first and second attaching means so the movable pulley half is axially displaced toward the fixed pulley half; and
 a means for biasing the movable pulley half toward the fixed pulley half.

* * * * *